United States Patent [19]

Billig et al.

[11] Patent Number: 5,448,406
[45] Date of Patent: Sep. 5, 1995

[54] METHOD AND DEVICE FOR MINIMIZING INITIAL SURFACE REFLECTIONS IN A DISPLAY SCREEN

[75] Inventors: Jan Billig, Göteborg; Anders Hallén, Kullavik, both of Sweden

[73] Assignee: AB Volvo, Sweden

[21] Appl. No.: 333,745

[22] Filed: Nov. 3, 1994

Related U.S. Application Data

[63] Continuation of Ser. No. 977,418, Apr. 19, 1993, abandoned.

[30] Foreign Application Priority Data

Aug. 30, 1990 [SE] Sweden ................. 9002766

[51] Int. Cl.$^6$ ................. G02B 27/00
[52] U.S. Cl. .................. 359/609; 359/601; 359/613; 359/632
[58] Field of Search ............. 359/630, 601, 602, 603, 359/609, 613, 631, 632, 633; 180/90; 340/461, 705

[56] References Cited

U.S. PATENT DOCUMENTS

| | | | |
|---|---|---|---|
| 4,225,005 | 9/1980 | Okabayashi | 180/90 |
| 4,521,078 | 6/1985 | Baeger | 359/62 |
| 4,846,096 | 7/1989 | Hoehn | 116/334 |
| 5,013,135 | 5/1991 | Yamamura | 359/601 |
| 5,028,119 | 7/1991 | Hegg et al. | 359/632 |
| 5,051,735 | 9/1991 | Furukawa | 340/705 |
| 5,198,936 | 3/1993 | Stringfellow et al. | 359/633 |
| 5,237,455 | 8/1993 | Bordo et al. | 359/602 |
| 5,361,165 | 11/1994 | Stringfellow et al. | 359/631 |

FOREIGN PATENT DOCUMENTS

| | | |
|---|---|---|
| 0344968 | 5/1989 | European Pat. Off. . |
| 3225362 | 7/1982 | Germany . |
| 2203883 | 10/1988 | United Kingdom . |

OTHER PUBLICATIONS

"Motor Vehicle Driver's Eye Range"—SAE J941 Oct. 1985, SAE Recommended Practice, Report of the Body Engineering Committee, 34.91–34.98.

Primary Examiner—Georgia Y. Epps
Assistant Examiner—Michael A. Papalas
Attorney, Agent, or Firm—Lerner, David, Littenberg, Krumholz & Mentlik

[57] ABSTRACT

The present invention relates to a device for minimizing initial surface reflections which can be reflected from the surroundings via the reflecting surface of an electronic display screen in the direction towards a given observation position, whereby the display screen is arranged on a base, preferably mounted on a dashboard of a vehicle, whereby at least a certain region of, or adjoining, the base to which the display screen is intended to be attached, is treated in such manner that a low reflecting surface is obtained.

5 Claims, 3 Drawing Sheets

METHOD AND DEVICE FOR MINIMIZING INITIAL SURFACE REFLECTIONS IN A DISPLAY SCREEN

This is a continuation of application Ser. No. 07/977,418 filed Apr. 19, 1993, now abandoned.

TECHNICAL FIELD

The present invention relates to a method and a device for minimizing initial surface reflections which can be reflected from the surroundings via a reflecting surface of an electronic display screen in a direction towards a given observation position. The invention is primarily intended to be used to avoid those initial surface reflections which are visible to the observer in the glass screen of an electronic display screen mounted on the dashboard of a vehicle.

TECHNICAL PROBLEM

The use of electronic display screens is continuously increasing. The use of such screens in vehicles has until now been relatively limited, though it is generally seen to have large potential. Particularly when used in vehicles, it is important that the legibility is as good as possible. The higher the legibility, the shorter the time that is necessary to assimulate the information which is displayed on the screen. Accordingly, the shorter the period of distraction, the safer the driver is. One aspect which can have a negative effect on the legibility is light reflection on the surface of the display screen. This problem has been recognized for a long time and a plurality of measures have been suggested for its solution, such as glare treatment and matting of the display screen's surface.

BACKGROUND OF THE INVENTION

A method is known from U.S. Pat. No. 4,521,078 to avoid surface reflections which are visible to an observer on the surface of an electronic display which is mounted on the dashboard of a vehicle. This known method makes use of the fact that the windows of a vehicle are located relatively high up in relation to the dashboard and that the light which enters into the car can therefore be reflected in small quantities to the observer's position if the surface of the display screen is angled such that it forms an angle which is less than 90° in relation to the light path from the observer's eye to the surface of the information screen and further that it forms an angle less than 90° in relation to the longitudinal axis of the vehicle. The main part of the reflected light path is in such a case reflected to a region which is lower than the observation position. This known method accordingly minimizes the majority of the direct reflections which could bother the observer. In addition to this measure, the outer surface of the electronic display screen is provided with a polarizing filter to reduce to a certain extent indirect reflections in the display screen.

A polarizing filter reduces however only a small quantity of the indirect reflected light and is accordingly not a perfectly satisfactory solution. The risk thus remains that even with such a known device a reflection which is disturbing for the driver can arise in the surface of the electronic display screen.

A known method to totally avoid disturbing reflections, even indirect reflections, is shown in DE-C-32 25 362. In this method the display is placed in a shielded recess sunk into the dashboard. Such a solution is however not preferred due to size, difficulties of use and cost reasons.

The object of the present invention is to provide a method and a device to minimize initial surface reflections which can be reflected from the surroundings via the reflecting surface of an electronic display screen in the direction towards a given observation position in which the display screen is arranged above a base, preferably mounted on the dashboard in a vehicle.

SOLUTION

A further object of the present invention is to provide a device according to the invention which is easy to use, demands a limited space and which meets certain aesthetic requirements.

The object is achieved with a method according to the present invention which is characterized in that at least a certain region of, or adjoining, the base to which the display screen is intended to be arranged is treated in such a manner that a low reflecting surface is obtained.

The object is also achieved by means of a device according to the present invention which is characterized in that at least substantial parts of the surface in front of and adjoining the display screen have a low reflecting structure and/or in the preferred instance that substantial parts of a surface belonging to or arranged on the base which can coincide with a normal to the reflecting surface have a low reflecting structure.

BRIEF DESCRIPTION OF THE DRAWINGS

The invention will be described in more detail with help of embodiments with reference to the annexed drawings in which.

BEST MODE OF CARRYING OUT THE INVENTION

Figure 1:
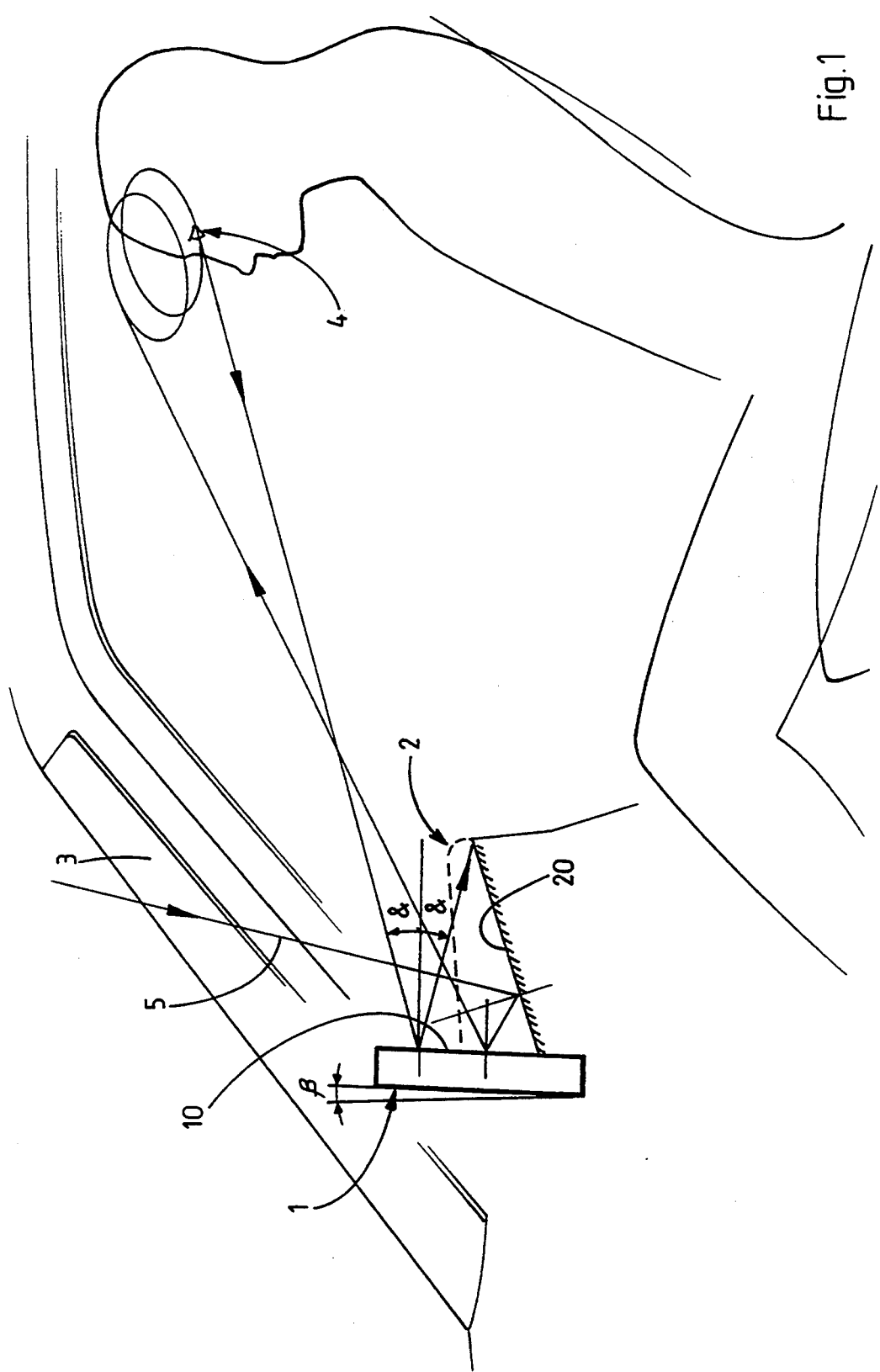
FIG. 1 is a schematic view of a cross section through a vehicle which is equipped with a device according to the invention.

FIG. 1 shows a longitudinal schematic cross section through a vehicle which is equipped with an electronic display screen 1. The display screen 1 is mounted on the dashboard 2 under the rearwardly angled windscreen 3. An observer's eye position (not shown) is indicated in principle with the aid of two overlapping ellipses 4. Each ellipse indicates for a certain body angle the region above and below respectively which 95% of drivers eyes, in a sitting position, are located in respect to a tangent which coincides with the line of sight to the object, in accordance to SAE J941. The schematically shown driver is therefore a borderline case.

The purpose of the present invention is, in addition to direct reflections, to also minimize indirect reflections which can reach the eyes of the observer, i.e. the ellipses 4, via the surface 10 of the display screen. Figure reference number 5 denotes a light beam which, if it is reflected in the upper surface of the dashboard 2 would give an indirect reflection via the surface 10 of the display screen to the observer position 4. Since, in accordance with the present invention, a certain region 20 of the dashboard 2 is provided with a low reflecting surface, it is however possible to minimize such an indirect reflection. The figure further shows that the display screen's surface 10 in the preferred case forms an acute angle β with the vertical and is directed downwardly. Furthermore, in the preferred embodiment, the display screen is foldably arranged upwards and downwards which will be further explained in the following.

Figure 2:
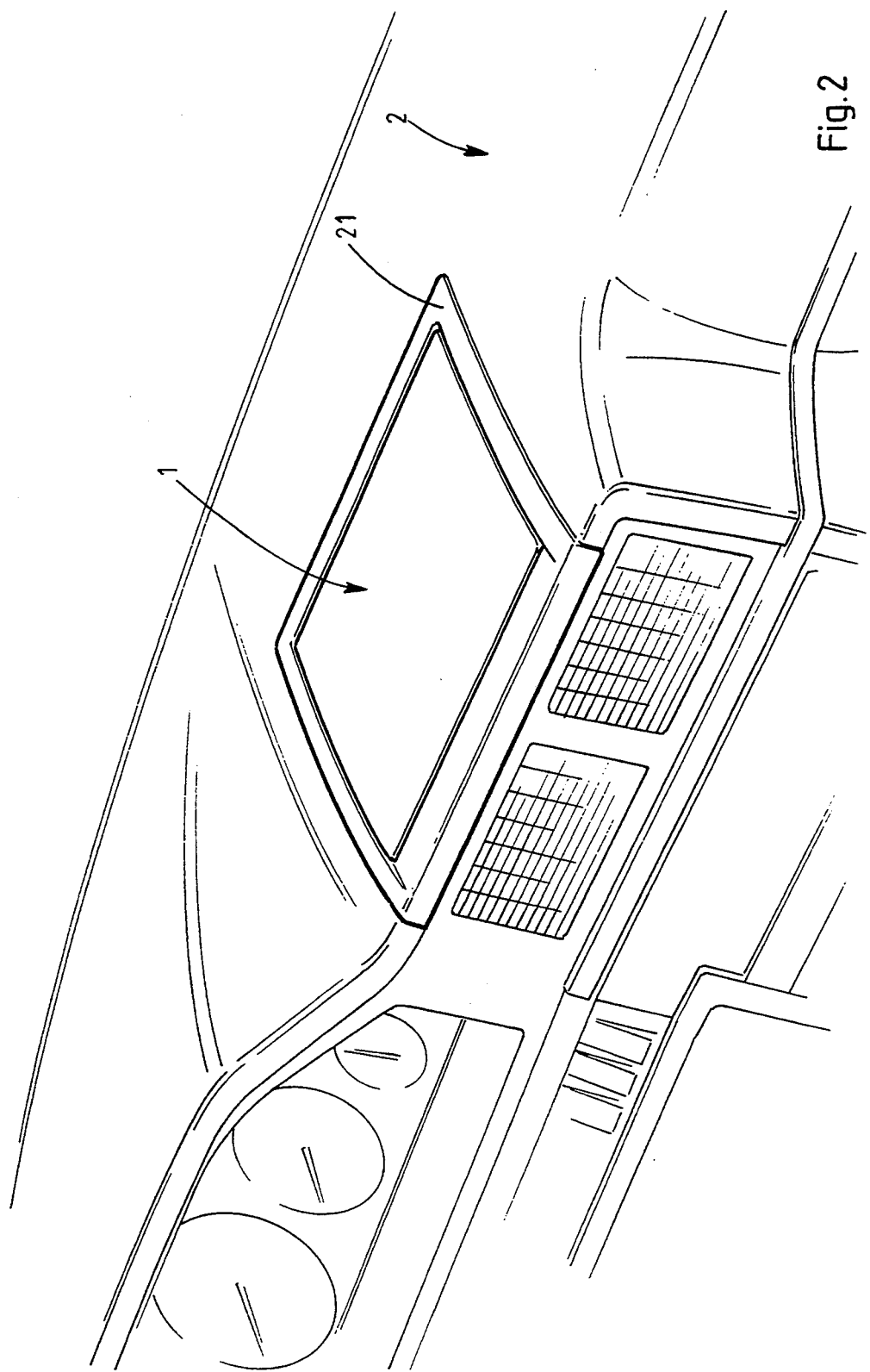
FIG. 2 shows a preferred embodiment of the invention in a stowed position and FIG. 3 shows the same device as in FIG. 2 but in a folded out position.
Figure 3:
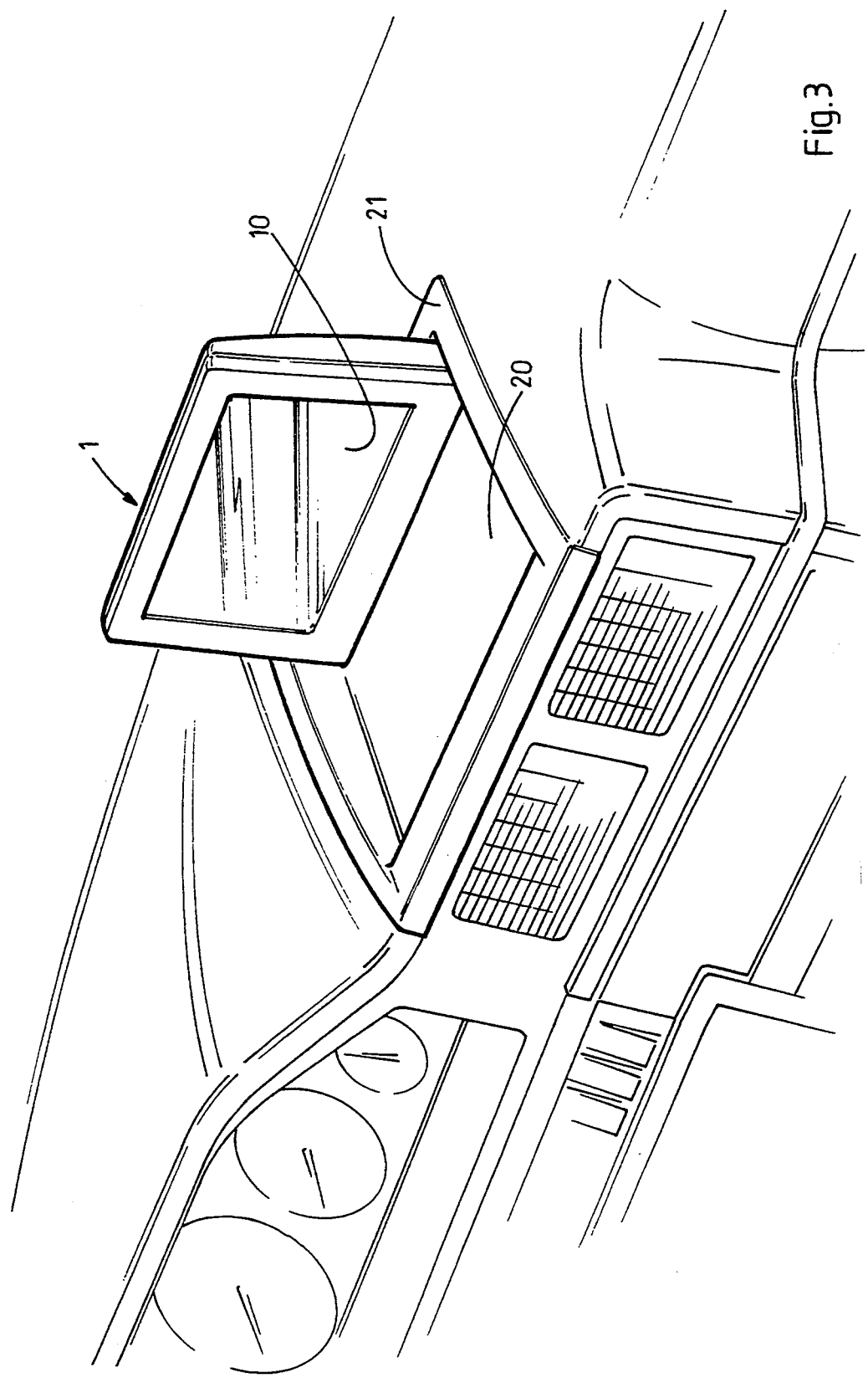

A preferred embodiment to the invention is shown in FIG. 2 in a folded down position. A frame 21 is arranged in a sunken position in the upper surface of the dashboard 2. An electronic screen 1 is retractably arranged with this frame unit 21. During deployment of the unit, the information screen is swung upwardly (manually or automatically) less than 90° to the position which is shown in FIG. 3. The display screen is provided with means (not shown) for maintaining it in the active position. The means can be chosen from a plurality of already known suitable applications, such as pivotable support legs, telescopic arms, pinion drive (pinion and electric motor), etc. The lower part 20 of the dashboard which is located underneath and in front of (in the direction towards the driver) the display screen surface 10 has a surface of low reflecting character, in accordance with the invention, i.e. a surface which when reflected in the display unit's front surface does not worsen the legibility for the driver of the information displayed on the screen.

The low reflecting surface 20 can for example be achieved by means of serrations, matt black colouring, low reflecting material, etc. The skilled man will recognize that the low reflecting surface 20 can either be formed as an integral part of the dashboard in a vehicle, or as a separate element intended for subsequent fitting. The skilled man will also appreciate that the active position of the display screen 1 in the figures is shown by way of example only. Accordingly, the angle formed between the low reflecting surface 20 and the electronic display screen 1 may vary up to 30° when the electronic display screen 1 is in its substantially vertical active position as shown in FIG. 1.

We claim:

1. A reflection minimizing apparatus comprising: a non-transparent display screen having a display surface thereon, said non-transparent display screen being mounted on a dashboard of a vehicle and being arranged for use in a substantially vertical position;
   a surface having reflection minimization means arranged on the dashboard for minimizing indirect reflections of incident light beams, said surface being arranged beneath and in front of said display surface and extending substantially transverse thereto when said non-transparent display screen is arranged in its substantially vertical position, said substantially vertical position of said non-transparent display screen being selected such that an imaginary axis extending perpendicularly to said display surface is disposed to intersect a plane defined by said reflection minimization means of said surface, said non-transparent display screen including a bottom portion and a top portion, said surface including a front portion substantially adjacent to and abutting said bottom portion of said non-transparent display screen, and a rear portion spaced from said non-transparent display screen, said non-transparent display screen being movable between said substantially vertical position and a stowed position substantially parallel to said reflection minimization means for said surface.

2. The reflection minimizing apparatus of claim 1 wherein said surface having reflection minimization means extending at a predetermined angle upwardly from a horizontal position from said rear portion toward said front portion thereof.

3. The reflection minimizing apparatus of claim 1 wherein said substantially vertical position of said non-transparent display screen is offset from a true vertical axis by an acute angle so that said imaginary axis extending perpendicularly to said display surface is disposed to intersect a plane defined by said surface having a low degree of reflectivity.

4. The reflection minimizing apparatus of claim 1 wherein surface having a low degree of reflectivity comprises serrations.

5. The reflection minimizing apparatus of claim 1 wherein said surface having a low degree of reflectivity comprises a matt black color.

* * * * *